Jan. 30, 1962 R. B. BOURNE ET AL 3,018,840
ACOUSTIC DUCT AND PANEL CONSTRUCTION THEREFOR
Filed Aug. 28, 1959 3 Sheets-Sheet 1
FIG._1 (PRIOR ART)
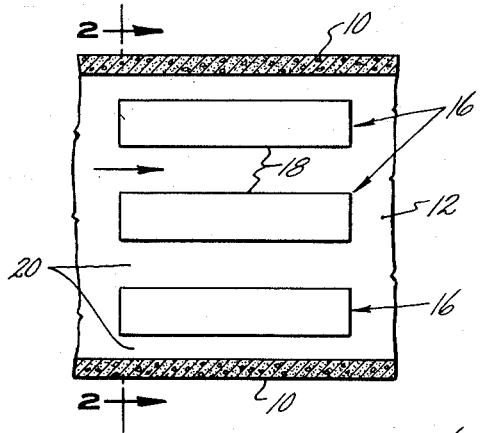
FIG._2 (PRIOR ART)
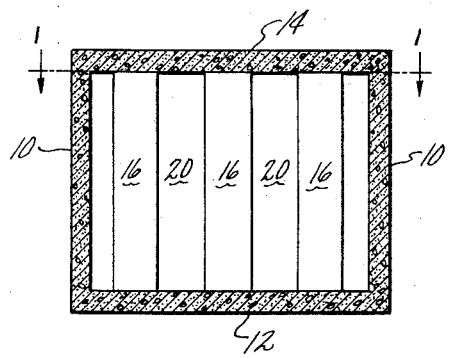
FIG._3 (PRIOR ART)
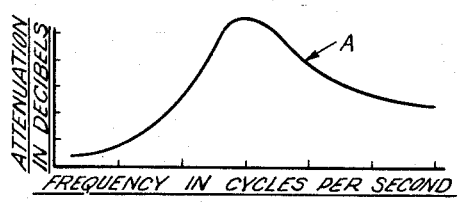
FIG._4
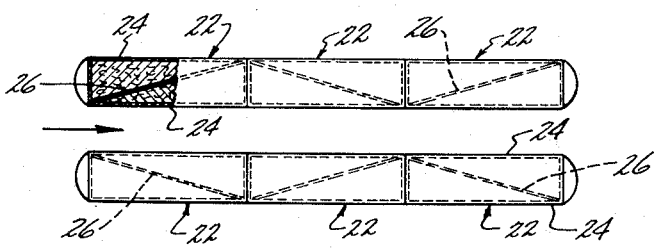
FIG._5
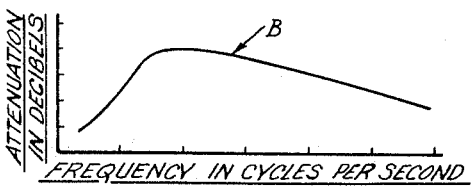
INVENTORS
JOHN P. TYSKEWICZ
ROLAND B. BOURNE
BY Teller & McCormick
ATTORNEYS Jan. 30, 1962 R. B. BOURNE ET AL 3,018,840
ACOUSTIC DUCT AND PANEL CONSTRUCTION THEREFOR
Filed Aug. 28, 1959 3 Sheets-Sheet 2

INVENTORS
JOHN P. TYSKEWICZ
ROLAND B. BOURNE
BY Teller & McCormick
ATTORNEYS

INVENTORS
JOHN P. TYSKEWICZ
ROLAND B. BOURNE
BY Teller & McCormick
ATTORNEYS though the acoustic or gas duct of a jet engine test cell approximately at 1—1 in FIG. 2 so as to provide a plan

United States Patent Office 3,018,840
Patented Jan. 30, 1962

3,018,840
ACOUSTIC DUCT AND PANEL CONSTRUCTION THEREFOR
Roland B. Bourne, West Hartford, and John P. Tyskewicz, Hartford, Conn., assignors, by mesne assignments, to American Machine & Foundry Company, Inc., New York, N.Y., a corporation of New Jersey
Filed Aug. 28, 1959, Ser. No. 836,809
12 Claims. (Cl. 181—33)

This invention relates to improvements in sound attenuating devices and, more particularly, to improvements in acoustic ducts of the type employed in jet engine test cells and improvements in panel constructions for use in such ducts.

The acoustic ducts and panels of this invention are to be used primarily in sound attenuating applications where a high volume of sound-carrying gas is encountered and wherein it is impractical to use discrete silencer or muffler devices. A jet engine test cell is typical of an application wherein silencers per se are not practical due to the gas volume. In test cell installations there is generally provided a concrete structure having a cross-sectional area which is substantially uniform throughout its length and the structure extends in a straight line to form a duct or passageway wherein the sound absorbing or acoustic panels are disposed to attenuate the noise accompanying the high volume flow of gas. The cross-sectional area of such ducts is generally so large as to require partitioning to define a plurality of parallel passageways, and sound absorbing panels are commonly utilized to partition the ducts and to attenuate the sound in the passageways thus defined. Such panels are oftentimes referred to as "splitter" panels.

In the simplest known form, the splitter panels are flat and of generally rectangular shape. The walls of the panels are formed of sheet metal, major area side walls thereof ordinarily being perforate, and the interior of the panel is generally packed with a sound absorbing material such as glass wool. The panels are arranged within the test cell duct with their major area perforate side walls exposed to the aforesaid passageways, the said major area side walls cooperating with each other and with the walls of the cell or duct to define the said passageways.

It has been determined by experimentation that the aforedescribed typical flat wall panels packed with sound absorbing material have the general acoustic characteristics of "open" linear resonators; i.e., linear resonators which are open at both ends. Thus, the sound frequency which is afforded maximum attenuation by such a panel may be determined by dividing the constant 6800 by $t$ (the panel thickness in inches) and then multiplying by an experimentally derived factor representing the loading effect of the sound absorbing packing in the panel. The loading factor varies with the type and density of the packing, but for purposes of example may be taken as substantially 0.6 where the packing comprises glass wool at a density of from 4 to 6 lbs. per cubic foot. Temperature effects are also significant and the above-stated relationship is substantially correct only for free air temperature at 70° F. For temperatures other than 70° F., the frequency afforded maximum attenuation changes in proportion to the square root of the absolute temperature.

As mentioned, the aforedescribed frequency response characteristics are exhibited by flat panels which are perforate on both exposed sides and which are filled with sound absorbing material. If a flat panel which has one perforate exposed side and one imperforate exposed side but which is otherwise identical with those described is employed, the frequency at which maximum attenuation occurs is lowered by one octave. That is, the panel takes on the acoustic characteristics of a "closed" linear resonator, a linear resonator having one open end and one closed end. In this instance, the sound frequency receiving maximum attenuation may be determined by dividing the constant 3400 by the panel thickness $t$ and multiplying by the loading factor 0.6.

By way of illustrating the foregoing frequency determinations, consider a 30 inch thick simple flat sided panel which is packed with glass wool at a density of 4 to 6 lbs. per cubic foot and which has both exposed sides perforate. The frequency receiving maximum attenuation in use of such "open" type panels in a test cell or duct is substantially equal to 6800 divided by 30 and multiplied by 0.6 or 136 c.p.s. If the aforesaid panel is of the "closed" type, perforate on one exposed side only, the frequency receiving maximum attenuation is substantially equal to 3400 divided by 30 and multiplied by 0.6 or 68 c.p.s.

It has long been recognized that the simple flat panels described above, while offering highly satisfactory attenuation for a relatively narrow band of sound frequencies, are quite deficient in response to frequencies below said band and also in response to frequencies above the band. Low frequency response is improved in the use of relatively thick panels and high frequency response is improved in the use of relatively thin panels. Thus, one obvious way of broadening the band of satisfactorily attenuated sound is to utilize panels of different thickness within an installation, a set of panels of one thickness being disposed in series with a set of panels of substantially different thickness. Even this arrangement, however, has disadvantages in that some high frequency sound will "beam" straight through the passageways defined by the panels within the engine test cell walls. Hence, it is desirable to dispose the panels in a "zig-zag" fashion whereby to provide similarly "zig-zag" passageways so that no line of sight path remains through the cell. This eliminates the beaming of high frequency sound waves through the passageways, but the disadvantages of flow resistance is encountered. This disadvantage may be reduced by using panels having curved exposed side walls whereby to reduce turbulence. Generally, when curved panels are used, the gas passageways defined thereby are approximately sinuous.

It is the general object of the present invention to provide an acoustic duct for high volume gas flow and which provides highly satisfactory sound attenuation over a broader range of frequencies than has been accomplished heretofore, and it is a part of this general object to provide improved acoustic panels for the duct which contribute to the broad range of sound attenuating efficiency thereof.

It is a more specific object of the invention to provide for broader range sound attenuation in both straight and curved acoustic panels.

It is a further object of the invention to provide an acoustic panel construction having the aforementioned characteristics and which is particularly sturdy and has a structural integrity lending advantage to its use in jet engine test cell installations or the like wherein the panels are subjected to severe operating conditions.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 1 is a horizontal cross-sectional view taken through the acoustic or gas duct of a jet engine test cell approximately at 1—1 in FIG. 2 so as to provide a plan view of conventional flat side acoustic panels employed therein.

FIG. 2 is a transverse sectional view of the acoustic or gas duct taken generally as indicated by the line 2—2 of FIG. 1.

FIG. 3 is a graph showing the sound attenuation curve to be expected in operation of the acoustic panels in the duct of FIGS. 1 and 2.

FIG. 4 is a top plan view of flat side acoustic panels constructed in accordance with the present invention, one of the panels being shown partly in horizontal cross section to illustrate details of construction.

FIG. 5 is a graph showing the sound attenuation curve to be expected in operation of a sound attenuating duct similar to that shown in FIGS. 1 and 2 but employing acoustic panels of the type shown in FIG. 4.

Figure 6:
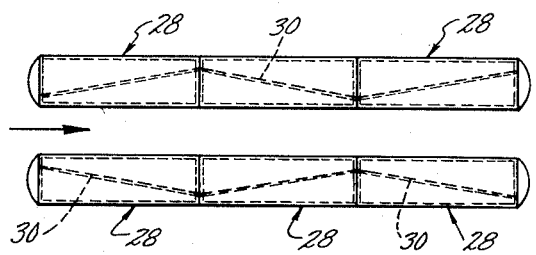
FIG. 6 is a view similar to FIG. 4 showing an alternative form of flat side panel construction provided in accordance with the present invention.

FIGS. 1 and 2 illustrate the manner in which the heretofore described conventional flat side wall panels may be employed in the gas passage duct of a jet engine test cell or the like. As shown, the duct is substantially rectangular in cross section and is made of concrete having side walls 10, 10, a bottom wall 12, and a top wall 14. The panels 16, 16 are flat and substantially rectangular in shape and are disposed in spaced apart relationship within the acoustic duct with their major area side walls 18, 18 disposed parallel to each other and to the side walls 10, 10 of the duct. The panels extend from the bottom wall 12 to the top wall 14 of the duct and thus define a plurality of parallel passageways 20, 20 extending longitudinally of the duct, the passageways being defined between adjacent panels and between the panels and the side walls of the duct.

In the conventional construction shown in FIGS. 1 and 2, the exemplary panels have perforate major area side walls 18, 18 and imperforate end walls and top and bottom walls. Additionally, the panels 16, 16 are packed with a sound absorbing material such as glass wool packed to a density of from 4 to 6 lbs. per cubic foot. Thus, in the conventional installation shown and described, the sound frequency receiving maximum attenuation is that which is substantially equal to the result of multiplying $0.6 \times 6800$ divided by $t$ where $t$ is the thickness of the panel in inches, the result being the frequency in cycles per second, assuming operation at an air temperature of approximately 70° F.

The attenuation curve to be expected in use of panels of the type shown in FIGS. 1 and 2 is illustrated in FIG. 3, and it will be observed that a relatively sharp peak occurs in the curve demonstrating that excellent attenuation occurs for a relatively narrow band of frequencies and that poor attenuation occurs at frequencies above and below the said narrow band. It should be observed particularly that the attenuation is very poor in the lower frequency level. By way of example, if the panels 16, 16 are each 30 inches thick, the sound frequency receiving maximum attenuation at an air temperature of approximately 70° F. can be calculated by multiplying 0.6 by 6800 divided by 30, the result being approximately 136 cycles per second.

In FIG. 4 there is illustrated a first acoustic panel provided in accordance with the present invention. Two rows of panels are shown in spaced apart relationship similar to the arrangement of the panels when employed in an acoustic duct such as the duct 10 shown in FIG. 1. Each row comprises three panels in a series arrangement, each panel being designated generally by the reference numeral 22. In general appearance, each panel 22 is similar to the conventional flat side panel 16. That is, each panel 22 has acoustically transparent major area side walls 24, 24 which are preferably perforate and each of said panels has acoustically opaque end walls and top and bottom walls, the said walls preferably being imperforate. However, each panel 22 differs substantially from the conventional panel 16 in structure and in acoustic characteristics in that each panel 22 has an internally disposed acoustically opaque partition or septum 26 extending from end wall to end wall of the panel. The septum 26 employed in each panel 22 is preferably imperforate and is angularly disposed within the panel. In the embodiment shown in FIG. 4, the septum 26 is arranged to extend from the corner joining one end wall and one major area side wall to the corner joining the other end wall and the other major area side wall whereby it can be said that the septum is precisely diagonal in the panel but extends longitudinally thereof.

The acoustic advantages obtained in utilizing the internal angularly disposed acoustically opaque septum are many. First, the low frequency response of the panel when compared to a conventional flat side acoustic panel of equal thickness is much improved. This advantage is obtained because the imperforate septum 26 causes the panel 22 to take on the acoustic characteristics of a closed resonating panel disposed in shunt to the main passageway, thereby reducing the maximum attenuation to a frequency substantially equal to one-half the frequency having maximum attenuation in the conventional open resonating panel.

A second major acoustic advantage obtained with the panel shown in FIG. 4 is that the attenuation response to the higher frequencies is improved. That is, by angularly disposing the imperforate septum 26 within the panel 22, a portion of the panel has an acoustic thickness substantially less than that of the conventional panel of FIGS. 1 and 2 to increase its acoustic response to the higher frequency sounds.

A third advantage obtained with the use of the panel shown in FIG. 4 is that the septum 26 prevents acoustic short circuiting between adjacent passageways.

The acoustic advantages gained are illustrated in the attenuation curve B of FIG. 5 when the said curve is compared to the curve A of FIG. 3. The curve B of FIG. 5 results from the use of the flat side panels shown in FIG. 4 of a thickness equal to the thickness of the panels of FIG. 1 and with a similar packing of sound absorbing material. It is to be observed that while the peak attenuation achieved with the improved panel construction is less than that achieved with the conventional panel, the peak attenuation occurs at a lower frequency and satisfactory attenuation is achieved over a much wider band of frequencies.

Panels 28, 28 shown in FIG. 6 are in all respects similar to the panels 22, 22 shown in FIG. 4 except that internally disposed acoustically opaque septa 30, 30 thereof are not precisely diagonally located. That is, each internal septum 30, while disposed at an angle with respect to the perforate side walls and imperforate end walls of its panel is nonetheless spaced from each of the perforate side walls. In the construction of a panel which has an overall thickness of 30 inches, the end edges of the internal septum are spaced preferably from two to three inches from the perforate side walls along the imperforate end walls and engage said end walls along a line which is parallel to said side walls.

Figure 7:
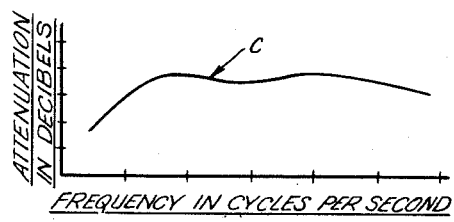
FIG. 7 is a graph showing the sound attenuation curve to be expected in use of the panels of FIG. 6 in an acoustic duct of the type shown in FIGS. 1 and 2.

The principal advantage obtained in this arrangement of the internal septum is to substantially increase the attenuation at the high frequency end of the sound spectrum. A slight increase in the low frequency cut-off is also encountered, but in most installations this is more than compensated for by the substantial improvement in high frequency attenuation. The attenuation advantages obtained may be seen in a comparison of FIG. 7 with FIG. 5, FIG. 7 showing an attenuation curve C for the panel arrangement shown in FIG. 6 incorporated in an acoustic duct of the type shown in FIGS. 1 and 2.

Figure 8:
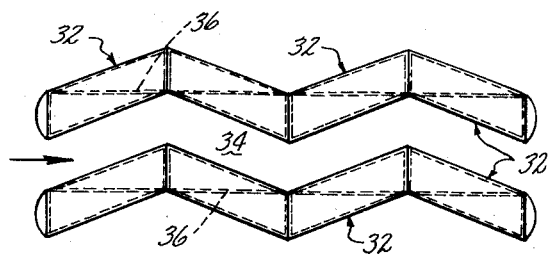
FIG. 8 is a plan view of a plurality of flat side panels constructed in accordance with the present invention and arranged in zig-zag fashion.

Another way of increasing the high frequency attenuation response of the flat side panel shown in FIG. 4 is to effect a modified arrangement of a plurality of improved panels as shown in FIG. 8. In FIG. 8, panels 32, 32 are of flat side construction and are generally rectangular, but they are connected end-to-end in zig-zag fashion to define a zig-zag path or passageway 34 between adjacent rows thereof. This necessitates disposing end walls of the panel at other than 90° to the side walls thereof in order to effect the necessary end-to-end connection. The internal imperforate septa 36, 36 are arranged diagonally within each panel as in FIG. 4.

Figure 9:
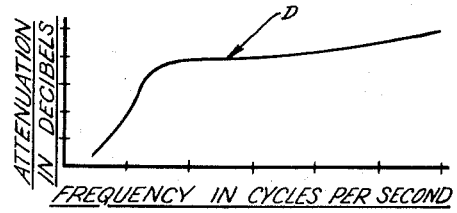
FIG. 9 is a graph showing the attenuation curve to be expected in use of the panels of FIG. 8 when incorporated in a duct of the type shown in FIGS. 1 and 2.

As previously mentioned, the zig-zag arrangement of the panels of FIG. 8 prevents "beaming" of high frequency sound and thus provides improved high frequency attenuation with respect to the attenuation obtained with the panel arrangement of FIG. 4. This is illustrated by comparing the attenuation curve D of FIG. 9, which shows the attenuation of the panels of FIG. 8 when incorporated in a duct similar to that of FIGS. 1 and 2, with the attenuation curve B of FIG. 5.

Figure 10:
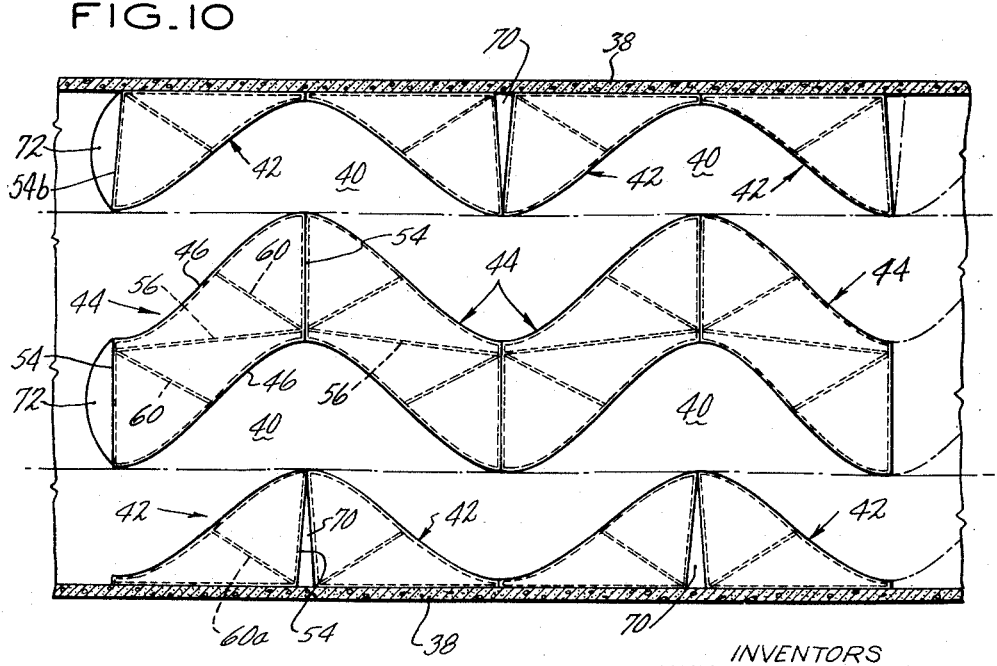
FIG. 10 is a view similar to FIG. 1 showing a plurality of curved side wall panels constructed in accordance with the present invention and disposed within an acoustic duct.
Figure 11:
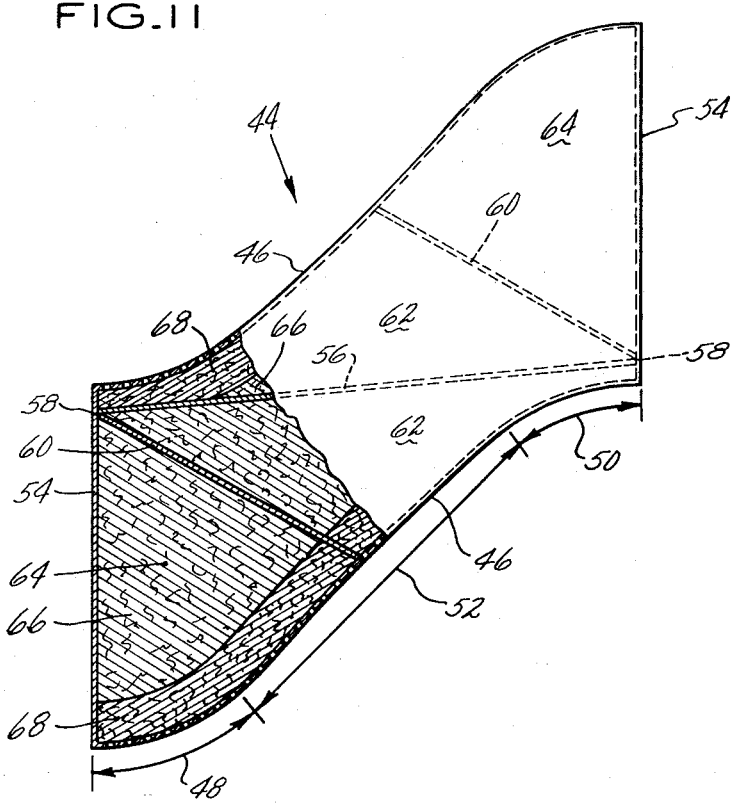
FIG. 11 is a plan view shown partially in horizontal section of the curved side wall panels of FIG. 10.
Figure 12:
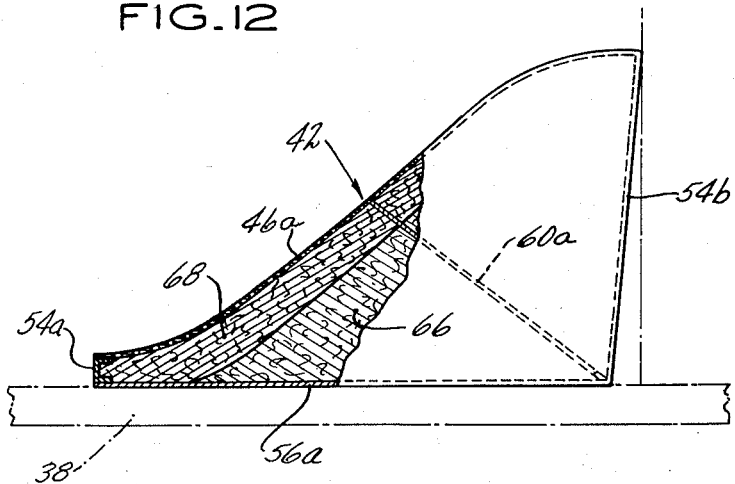
FIG. 12 is a view similar to FIG. 11 showing a curved side wall panel which is particularly adapted for installation along the side walls of the acoustic duct shown in FIG. 10.

The presently preferred panel construction and the presently preferred arrangement thereof within an acoustic duct are shown in FIGS. 10, 11 and 12. Here again, the acoustic duct has straight concrete side walls 38, 38 and similar bottom and top walls and the panels are disposed within the duct to define spaced apart longitudinally extending but nonetheless zig-zag passageways 40, 40 therethrough. It will be observed that the side walls of the duct are lined with a specific form of the preferred panel indicated generally by the reference numeral 42, and it will also be observed that there is an intermediate row of panels 44, 44 of a specifically different form. There can be more than one row of panels 44, 44 disposed within the duct, but one such row is shown for purposes of illustration whereby there are two passageways 40, 40 defined within the duct.

The preferred panel 44 used in constructing the intermediate row or rows has two acoustically transparent major area side walls 46, 46 which are preferably perforate as shown and which are in all respects similar to each other. One end portion 48 of each side wall 46 is curved rather sharply in one direction and an opposite end portion 50 of each side wall is curved rather sharply in the opposite direction. An intermediate portion 52 connecting the said two end portions of each side wall is curved gradually in opposite directions from its mid point. Thus, it will be seen that the contour of each side wall 46 is approximately that of a segment of a sine curve.

Substantially parallel flat end walls 54, 54 of the panel 44 are acoustically opaque and preferably imperforate. Said end walls engage and are welded to the curved side walls 46, 46 so as to be substantially normal to the curved end portions 48 and 50 of the said walls. The panel 44 also has acoustically opaque and preferably imperforate top and bottom walls. All of the panels 44, 44 are of equal length from end wall to end wall and they can be provided in any conventional width and length so as to be stacked atop each other if required and end-to-end in a row or rows, the said row or rows extending from the bottom wall to the top wall within the duct as well as generally longitudinally thereof.

In further accord with the present invention, the panel 44 has disposed therein an acoustically opaque septum 56. The septum 56 is preferably imperforate and extends from one end wall 54 to the other end wall 54. Said septum joins each end wall along a line 58 which is parallel to and spaced (approximately 2 to 3 inches in the embodiment shown) from the edge of the end wall joining the edge of the curved side wall. Thus, it can be said that the internal imperforate septum 56 is generally diagonally disposed in the panel. In addition to the imperforate septum 56, there are provided a pair of acoustically opaque and preferably imperforate partitions 60, 60 in each panel 44. The partitions 60, 60 extend from the lines of connection 58, 58 between the imperforate septum 56 and the end walls 54, 54 to the respective curved side walls 46, 46. It will be noted that the imperforate partitions 60, 60 are shown as joining the curved side walls 46, 46 intermediate the ends thereof and substantially at the point of reversal of curvature of the intermediate portions 52, 52 thereof.

Thus, each imperforate partition 60 divides the interior of the panel 44 on each side of the imperforate septum 56 into two sections, these being designated by the reference numbers 62 and 64, respectively. While the imperforate partitions 60, 60 increase the strength and structural integrity of the panel, they provide an acoustic advantage as well. That is, the low frequency attenuation and cut off is improved by their incorporation.

As in the case of the panels described above, each of the panels 44, 44 is packed with a suitable sound absorbing material, the interior sections 62 and 64 thereof being separately packed. Preferably, and as shown, each of said interior sections has its inner portion packed with a sound absorbing material or filler 66 having a density of about 4 lbs. per cubic foot, the outer portion of the interior sections of each panel being packed with layers of filler 68 having a density of about 6 lbs. per cubic foot.

The preferred panel 42 utilized to line the side walls 38, 38 of the duct in end-to-end fashion comprises substantially one-half of the panel 44 used in the intermediate row or rows in the duct. That is, the panel 42 has one perforate curved side wall 46a similar to but slightly shorter than the curved side walls 46, 46 of the panel 44. Imperforate end walls 54a and 54b extend from opposite ends of the side wall 46a to a flat imperforate side or back wall 56a which is similar to but slightly shorter than the internal imperforate septum 56 of the panel 44. The imperforate end wall 54a is relatively narrow and is similar to the portion of an end wall 54 of the panel 44 which lies between the end edge of a septum 56 and an adjacent curved side wall 46 of the panel 44. Said end wall 54a is substantially perpendicular to the curved side wall 46a at its point of connection therewith and substantially perpendicular to the flat side or back wall 56a at its point of connection therewith. The opposite imperforate end wall 54b is substantially wider than the end wall 54a and is similar to the portion of an end wall 54 of the panel 44 which lies between the end edge of a septum 56 and the curved side wall 46 of said panel opposite said adjacent curved side wall. Said end wall 54b is substantially perpendicular to the curved side wall 46a at its point of connection therewith but the included angle between the end wall 54b and the back wall 56a is oblique or greater than 90° and substantially equal to the corresponding included angle between an end wall 54 and an internal imperforate septum 56 of the panel 44. Extending from the line of connection between the back wall 56a and the end wall 54b of the panel 42 is an imperforate partition 60a similar to the imperforate partition 60 of the panel 44. Said partition joins the curved side wall 46a of the panel 42 substantially at the mid point or the point of reversal of curvature of said wall. Packing of the interior of the panel 42 with filler or sound absorbing material is accomplished in a manner substantially identical with the packing of the panels 44, 44.

It will be seen with reference to FIG. 10 that the panels 44, 44 are arranged end-to-end to define a zig-zag row in the acoustic duct and it will be further seen that the panels 42, 42 along the wall of the duct are arranged end-to-end in spaced relationship with the row of panels 44, 44 to define generally sinuous passageways therebetween. The panels 42, 42 have their back walls 56a, 56a flatly in engagement with the duct walls and similar end walls of adjacent panels are adjacent each other. Thus, the end walls 54b, 54b of adjacent panels 42, 42, due to their above-described oblique angular relationship with the back walls of their respective panels, engage each other at their inner ends but are spaced apart at their outer ends and cooperatively define substantially V-shaped cavities 70, 70 therebetween. The curved side walls 46a and the back walls 56a of the panels are slightly shorter than the corresponding walls 46, 46 and septa 56, 56 of the panels 44, 44 as described and the relative lengths of said walls are such that the longitudinal extent of a panel 42 arranged in the duct as shown and described is equal to the longitudinal extent of a panel 44 arranged in the duct. Thus, the curved side wall panels 46a, 46a collectively define approximately sinusoidal curves which are in phase with approximately sinusoidal curves defined collectively by the walls 46, 46 of the panels 44, 44 whereby to define the aforementioned generally sinuous passageways.

One distinct advantage in arranging the panels 42, 42 and the panels 44, 44 to provide sinuous passageways 40, 40 is to reduce the turbulence of the gas stream passing through the duct. In further keeping with reduction of turbulence and specifically to minimize entrance and exit losses, a curved sheet metal end plate 72 is placed over each end wall 54 and 54b of a panel which may otherwise be exposed to the flowing gas stream. The curved end plates 72, 72 provide streamlining.

From the foregoing, it will be apparent that the composite construction shown in FIG. 10 comprises all of the best features of panel construction heretofore described. That is, the panels utilized in the preferred construction of FIG. 10 have internally disposed imperforate septa to reduce the low frequency cut off and thus to increase the attenuation in the lower frequencies and the internal imperforate septa are generally diagonally disposed with respect to the end walls of the panels to provide panel portions of shallow depth which broaden the attenuation range in the high frequency direction. Additionally, the perforate side walls of the panels are curved to provide zig-zag passageways which prevent high frequency beaming of sound waves and which minimize turbulence in the noise bearing gas stream. The structural integrity as well as the sound attenuating efficiency of the panels is further enhanced by the incorporation of imperforate partitions which extend between the internal septa or back walls of the panels to their curved side walls.

The invention claimed is:

1. A sound absorbing device comprising a hollow panel which can be packed with a sound absorbing material and which has a pair of generally longitudinally extending substantially parallel and acoustically transparent side walls, a pair of substantially parallel acoustically opaque end walls respectively connected to opposite ends of the side walls, acoustically opaque top and bottom wall means closing the openings defined by said side walls and end walls, and an acoustically opaque septum disposed within the panel and extending between said end walls and said top and bottom wall means, said septum being disposed generally diagonally of the panel and engaging one end wall along a line which is adjacent one side wall but which is nonetheless spaced therefrom and engaging the other end wall along a line which is adjacent the other side wall but which is nonetheless spaced therefrom.

2. A sound absorbing device comprising a hollow panel which can be packed with a sound absorbing material and which has a pair of opposed substantially parallel and similarly curved acoustically transparent side walls, the said side walls extending generally longitudinally of the panel and being curved in one direction at one end and in the opposite direction at the other end, a pair of substantially parallel acoustically opaque end walls respectively connected to the opposite ends of the side walls, acoustically opaque top and bottom wall means closing the openings defined by the end walls and the longitudinally extending curved edges of the side walls, and an acoustically opaque septum disposed generally diagonally within the panel and extending between the end walls and between said top and bottom wall means.

3. A sound absorbing device comprising a hollow panel which can be packed with a sound absorbing material and which has a pair of opposed substantially parallel and similarly curved acoustically transparent side walls, the said side walls extending longitudinally of the panel and being curved in one direction at one end and in the opposite direction at the other end, a pair of substantially parallel acoustically opaque end walls respectively connected to the opposite ends of the side walls, acoustically opaque wall means closing the openings defined by the end walls and the longitudinally extending curved edges of the side walls, and an acoustically opaque septum disposed within the panel extending between the end walls and between said wall means, said septum being disposed generally diagonally of the panel and engaging one end wall along a line which is adjacent one side wall but which is nonetheless spaced therefrom and engaging the other end wall along a line which is adjacent the other side wall but which is nonetheless spaced therefrom.

4. A sound absorbing device comprising a hollow panel which can be packed with a sound absorbing material and which has a pair of opposed substantially parallel and similarly curved acoustically transparent side walls, the said side walls extending longitudinally of the panel and being curved in one direction at one end and in the opposite direction at the other end, a pair of substantially parallel acoustically opaque end walls respectively connected to the opposite ends of the side walls, acoustically opaque wall means closing the openings defined by the end walls and the longitudinally extending curved edges of the side walls, an acoustically opaque septum disposed within the panel extending between the end walls and between said top and bottom wall means, said septum being disposed generally diagonally of the panel and engaging one end wall along a line which is parallel to and adjacent one side wall but which is nonetheless spaced therefrom and engaging the other end wall along a line which is parallel to and adjacent the other side wall but which is nonetheless spaced therefrom, and first and second acoustically opaque partitions disposed within the panel, said first partition extending between said top and bottom wall means and from the corner joining said septum with said one end wall to said other side wall, and said second partition extending between said top and bottom wall means and from the corner joining said septum with said other end wall to said one side wall.

5. A sound absorbing device comprising a hollow panel which can be packed with a sound absorbing material and which has a pair of opposed substantially parallel and similarly curved acoustically transparent side walls, the said side walls extending longitudinally of the panel and being curved in one direction at one end and in the opposite direction at the other end, a pair of substantially parallel acoustically opaque end walls respectively connected to the opposite ends of the side walls, acoustically opaque wall means closing the openings defined by the end walls and the longitudinally extending curved edges of the side walls, an acoustically opaque septum disposed within the panel extending between the end walls and between said top and bottom wall means, said septum being disposed generally diagonally of the panel and engaging one end wall along a line which is parallel to and adjacent one side wall but which is nonetheless spaced therefrom and engaging the other end wall along a line which is parallel to and adjacent the other side wall but which is nonetheless spaced therefrom, and first and second acoustically opaque partitions disposed within the panel, said first partition extending between said top and bottom wall means and from the corner joining said septum with said one end wall to approximately the mid point of said other side wall, and said second partition extending between said top and bottom wall means and from the corner joining said septum with said other end wall to approximately the mid point of said one side wall.

6. A sound absorbing device comprising a hollow panel which can be packed with a sound absorbing material and which has a pair of opposed side walls which extend generally longitudinally of the panel, one of said side walls being acoustically transparent and being curved in one direction at one end and in an opposite direction at the other end, and the other of said side wall being acoustically opaque and substantially flat, a pair of acoustically opaque end walls of substantially different width respectively connected to the opposite ends of the side walls, the end wall of lesser width being substantially perpendicular to each of the side walls at its point of connection therewith and the end wall of greater width being substantially perpendicular to the curved side wall at its point of connection therewith, acoustically opaque top and bottom wall means closing the openings defined by the edges of said end walls and side walls, and an acoustically opaque partition extending between said top and bottom wall means and the corner joining the wider end wall with said flat side wall to approximately the mid point of said curved side wall.

7. A sound absorbing device comprising a hollow panel which can be packed with a sound absorbing material and which has a pair of opposed side walls which extend generally longitudinally of the panel, one of said side walls being acoustically transparent and being curved in one direction at one end and in an opposite direction at the other end, and the other of said side walls being acoustically opaque and substantially flat, a pair of acoustically opaque end walls of substantially different width respectively connected to the opposite ends of the side walls, the end wall of lesser width being substantially perpendicular to each of the side walls at its points of connection therewith and the end wall of greater width being substantially perpendicular to the curved side wall at its point of connection therewith but arranged to define an oblique included angle with said flat side wall at its point of connection therewith, acoustically opaque top and bottom wall means closing the openings defined by the edges of said end walls and side walls, and an acoustically opaque partition extending between said top and bottom wall means and the corner joining the wider end wall with said flat side wall to approximately the mid point of said curved side wall.

8. In an acoustic duct wherein a large volume of noise carrying fluid is encountered, the combination of a first plurality of sound attenuating panels arranged in end-to-ed relationship along the side walls of the duct and a second plurality of sound attenuating panels arranged in end-to-end relationship in one or more generally longitudinally extending transversely spaced rows in said duct and adapted to define with said first plurality of panels a plurality of generally longitudinally extending and approximately sinusoidal passageways in the duct, each of the panels along the side walls of the duct having a pair of opposed side walls one of which is acoustically transparent and has a contour approximating a segment of a sine curve and the other of which is acoustically opaque and substantially flat, a pair of acoustically opaque end walls of substantially different width respectively connected to the opposite ends of the side walls with the end wall of lesser width substantially perpendicular to each of the side walls at its points of connection therewith and the end wall of greater width substantially perpendicular to the curved side wall at its point of connection therewith, acoustically opaque top and bottom wall means closing the openings defined by the edges of said end walls and side walls, and an acoustically opaque partition extending between said top and bottom walls and the corner joining the wider end wall with said flat side wall to approximately the mid point of said curved side wall, and each of the panels in said one or more rows having a pair of opposed substantially parallel similarly curved acoustically transparent side walls which have contours approximating segments of sine curves, a pair of substantially parallel acoustically opaque similar end walls respectively connected to the opposite ends of the side walls, acoustically opaque top and bottom wall means closing the openings defined by the edges of said side and end walls, an acoustically opaque septum extending between the end walls and between said top and bottom wall means and disposed generally diagonally of the panel and engaging one end wall along a line which is parallel to and adjacent one side wall but nonetheless spaced therefrom and engaging the other end wall along a line which is parallel to and adjacent the other side wall but nonetheless spaced therefrom.

9. In an acoustic duct wherein a large volume of noise carrying fluid is encountered, the combination of a first plurality of sound attenuating panels arranged in end-to-end relationship along the side walls of the duct and a second plurality of sound attenuating panels arranged in end-to-end relationship in one or more generally longitudinally extending transversely spaced rows in said duct and adapted to define with said first plurality of panels a plurality of generally longitudinally extending and approximately sinusoidal passageways in the duct, each of the panels along the side walls of the duct having a pair of opposed side walls one of which is acoustically transparent and has a contour approximating a segment of a sine curve and the other of which is acoustically opaque and substantially flat, a pair of acoustically opaque end walls of substantially different width respectively connected to the opposite ends of the side walls with the end wall of lesser width substantially perpendicular to each of the side walls at its points of connection therewith and the end wall of greater width substantially perpendicular to the curved side wall at its point of connection therewith but arranged to define an oblique included angle with said flat side wall whereby to provide for a substantially V-shaped cavity between the wider end walls of adjacent panels along the duct walls, acoustically opaque top and bottom wall means closing the openings defined by the edges of said end walls and side walls, and an acoustically opaque partition extending between said top and bottom walls and the corner joining the wider end wall with said flat side wall to approximately the mid point of said curved side wall, and each of the panels in said one or more rows having a pair of opposed substantially parallel similarly curved acoustically transparent side walls which have contours approximating segments of sine curves, a pair of substantially parallel acoustically opaque similar end walls respectively connected to the opposite ends of the side walls, acoustically opaque top and bottom wall means closing the openings defined by the edges of said side and end walls, an acoustically opaque septum extending between the end walls and between said top and bottom wall means and disposed generally diagonally of the panel and engaging one end wall along a line which is parallel to and adjacent one side wall but nonetheless spaced therefrom and engaging the other end wall along a line which is parallel to and adjacent the other side wall but nonetheless spaced therefrom.

10. Sound attenuating means for use in an acoustic duct wherein a large volume of noise carrying fluid is encountered, said means comprising a plurality of hollow panels which can be packed with a sound absorbing material and each of which has a pair of generally longitudinally extending substantially parallel and acoustically transparent side walls, a pair of substantially parallel acoustically opaque end walls respectively connected to opposite ends of the side walls acoustically opaque top and bottom wall means closing the openings defined by said side walls and end walls, and an acoustically opaque septum disposed within the panel and extending between said end walls and said top and bottom wall means, said septum being disposed generally diagonally of the panel and engaging one end wall along a line which is adjacent one side wall but which is nonetheless spaced therefrom and engaging the other end wall along a line which is adjacent the other side wall but which is nonetheless spaced therefrom, and said panels being arranged in zig-zag end-to-end relationship in a plurality of generally longitudinally extending and transversely spaced rows in said duct whereby to define a plurality of generally longitudinally extending separate zig-zag passageways for attenuating the sound carried by the fluid.

11. In an acoustic duct wherein a large volume of noise carrying fluid is encountered, the combination of a plurality of sound attenuating panels arranged in end-to-end relationship in a plurality of generally longitudinally extending transversely spaced rows in said duct and adapted to define a plurality of generally longitudinally extending and approximately sinusoidal passageways in the duct, each of said panels having a pair of opposed substantially parallel similarly curved acoustically transparent side walls which have contours approximating segments of sine curves, a pair of substantially parallel acoustically opaque similar end walls respectively connected to the opposite ends of the side walls, acoustically opaque top and bottom wall means closing the openings defined by the edges of said side and end walls, and an acoustically opaque septum disposed generally diagonally within the panel and extending between the end walls thereof and between said top and bottom wall means.

12. The combination in an acoustic duct as set forth in claim 11 wherein the septum in each panel engages one end wall of the panel along a line which is parallel to and adjacent one side wall thereof but nonetheless spaced therefrom, and wherein said septum engages the other end wall of the panel along a line which is parallel to and adjacent the other side wall thereof but nonetheless spaced therefrom.

References Cited in the file of this patent

UNITED STATES PATENTS

| | | |
|---|---|---|
| 2,161,708 | Heerwagen | June 6, 1939 |
| 2,270,825 | Parkinson et al. | Jan. 20, 1942 |
| 2,759,554 | Baruch | Aug. 21, 1956 |
| 2,759,556 | Baruch | Aug. 21, 1956 |
| 2,916,101 | Naman | Dec. 8, 1959 |